US012651186B1

(12) United States Patent
Tahan et al.

(10) Patent No.: US 12,651,186 B1
(45) Date of Patent: Jun. 9, 2026

(54) QUANTUM DEVICE INCLUDING 3D SUPERCONDUCTING-SEMICONDUCTING VOLTAGE-TUNABLE QUBITS

(71) Applicant: The Government of the United States as represented by the Director, National Security Agency, Ft. George G. Meade, MD (US)

(72) Inventors: Charles G. Tahan, Kensington, MD (US); Thomas M. Hazard, Arlington, MA (US); Andrew J. Kerman, Arlington, MA (US); Kyle A. Serniak, Somerville, MA (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 596 days.

(21) Appl. No.: 18/110,115

(22) Filed: Feb. 15, 2023

Related U.S. Application Data

(60) Provisional application No. 63/310,461, filed on Feb. 15, 2022.

(51) Int. Cl.
| | |
|---|---|
| *H10N 60/01* | (2023.01) |
| *G06N 10/20* | (2022.01) |
| *G06N 10/40* | (2022.01) |

(52) U.S. Cl.
CPC ............. *G06N 10/40* (2022.01); *G06N 10/20* (2022.01)

(58) Field of Classification Search
CPC ........ G06N 10/40; G06N 10/20; H10N 60/12; H10N 60/128; H10N 60/205; H10N 60/207; H10N 60/805
See application file for complete search history.

(56) References Cited

U.S. PATENT DOCUMENTS

| | | |
|---|---|---|
| 2022/0121978 A1 | 4/2022 | Woods et al. |
| 2022/0300844 A1 | 9/2022 | Stehlik et al. |

FOREIGN PATENT DOCUMENTS

WO   WO-2019190460 A1 * 10/2019   ............. G06N 10/40

OTHER PUBLICATIONS

Stehlik, et al. Tunable coupling architecture for fixed-frequency transmon superconducting qubits, Phys. Rev. Lett. Aug. 20, 2021, pp. 080505-1-080505-6, 127.

(Continued)

*Primary Examiner* — Ermias T Woldegeorgis

(57) ABSTRACT

A quantum device including superconducting-semiconducting qubits and coupler designs based on high-quality, compact through-silicon vias (TSVs). An interposer probe wafer containing TSVs is used to contact a sample wafer with, for example, a superconductor-proximitized, epitaxially-grown, germanium quantum well. By utilizing the capacitance of the probe wafer TSVs, the majority of the electric field in the qubits is pulled away from lossy regions that are present in the semiconducting wafer. The probe wafer can reduce the qubit's electric field participation in the sample wafer by an order of magnitude for thin substrates and remains small even when the epitaxial layer thickness approaches 100 $\mu_\mu$m. This scheme is extensible to multi-qubit systems that have tunable qubit-qubit couplings without magnetic fields. This approach shrinks the on-chip footprint of voltage-tunable superconducting qubits and is applicable to super-semi heterostructures in a variety of systems.

15 Claims, 8 Drawing Sheets

(56) References Cited

OTHER PUBLICATIONS

Casparis, et al., Superconducting gatemon qubit based on a proximitized two-dimensional electron gas, Nat. Nanotechnol. Oct. 2018, pp. 915-920, vol. 13.

* cited by examiner

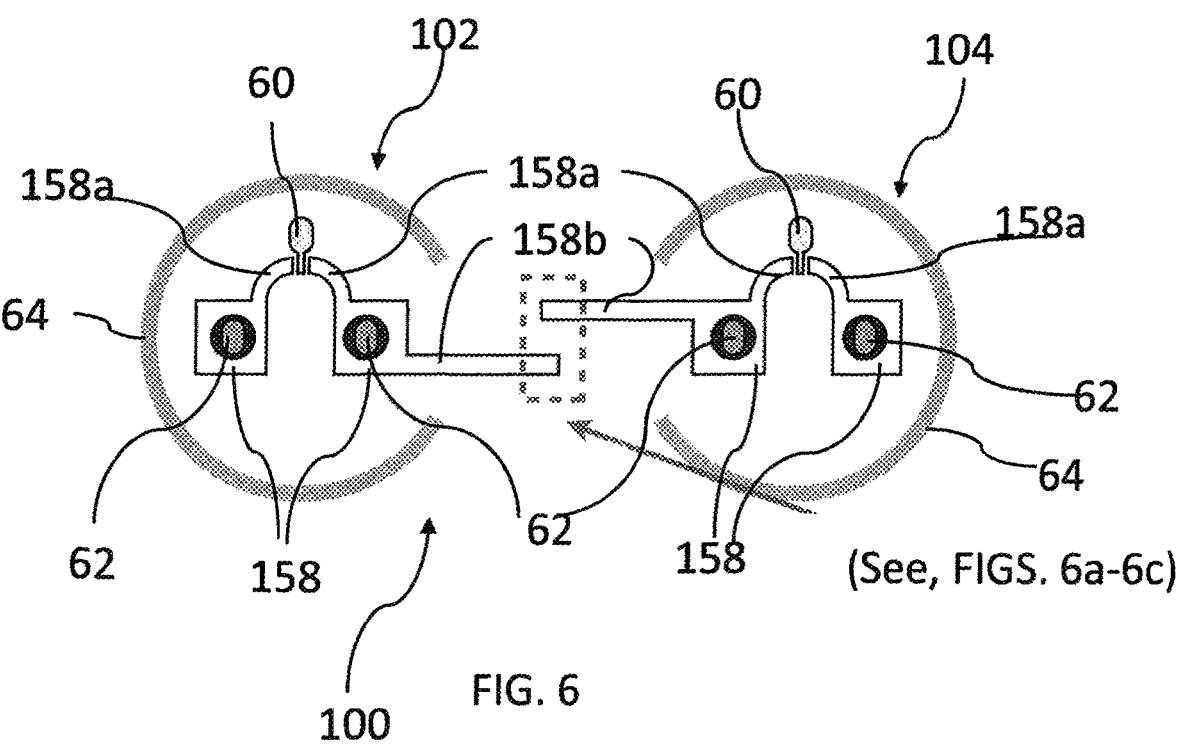
FIG. 6
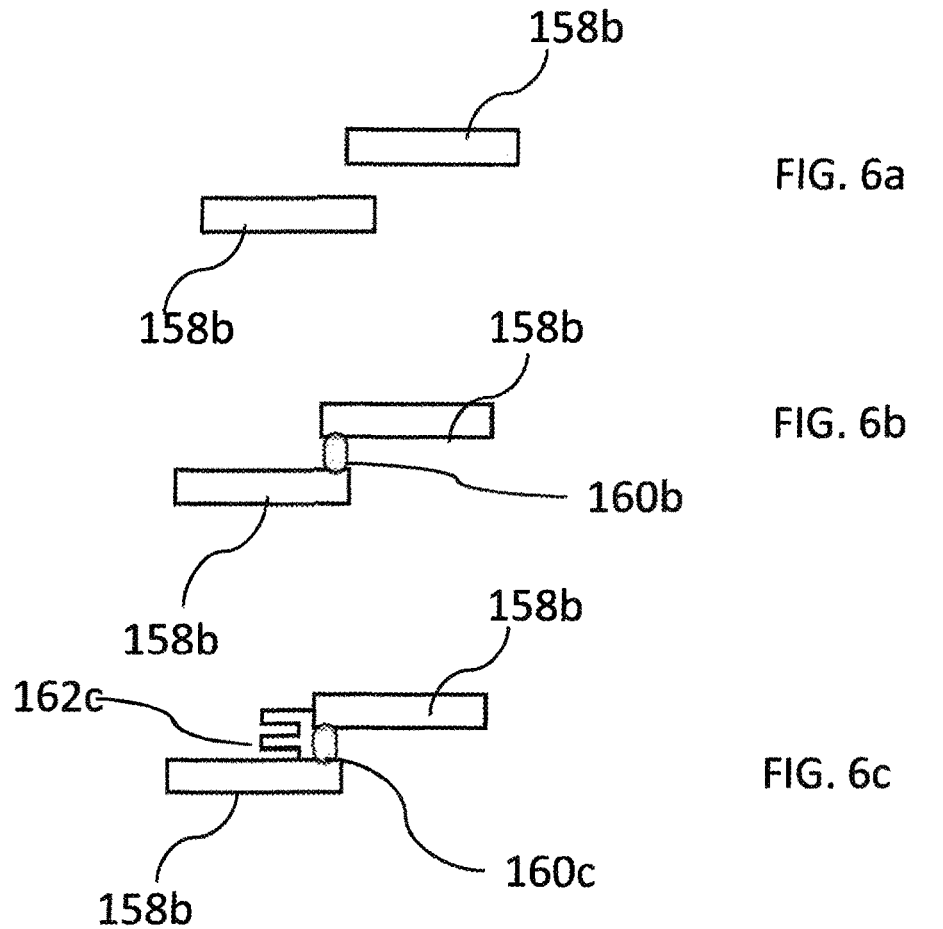
FIG. 6a
FIG. 6b
FIG. 6c (a)

(b)

(c)

QUANTUM DEVICE INCLUDING 3D SUPERCONDUCTING-SEMICONDUCTING VOLTAGE-TUNABLE QUBITS

PRIORITY CLAIM

This application claims the benefit of U.S. provisional patent application Ser. No. 63/310,461 entitled 3D super-conducting-Semiconducting Voltage Tunable Qubits filed Feb. 15, 2022.

GOVERNMENT SUPPORT

This invention was made with government support under FA8702-15-D-0001 awarded by the US Air Force. The government has certain rights in the invention.

BACKGROUND

Solid-state quantum devices based on superconducting Josephson junctions (JJs) have formed the basis for a variety of new quantum information technologies. JJ-based circuit QED, for example, has inspired the development of both qubits and associated control circuitry, such as readout resonators and parametric amplifiers. More recently, these techniques and technologies have been increasingly incorporated into semiconductor-based qubits for control, read-out, and long-range coupling. In particular, devices with voltage-tunable superconducting-semiconductor (super-semi) junctions, known as gatemons, have emerged as an interesting avenue both for developing new kinds of devices and for exploring the fundamental physics associated with highly transmissive channels.

An example of a prior art hybrid super-semi gatemon qubit is illustrated in FIG. 1. The gatemon qubit 10 is provided by a sample wafer 12 including an epitaxially grown SiGe heterostructure 14 on the surface of a high-resistivity silicon substrate 16 and generally planar super-conducting metal structures. The metal structures include a first portion 20 having an extension 20*a* and second portions 22 having an extension 22*a*. The extensions 20*a*, 22*a* are placed in close proximity to one another thereby leaving a gap 24 between the extensions and provided by the semi-conducting material SiGe forming a JJ. A gate 26 is positioned proximate the gap and provides an electrode for tuning the Josephson energy. A ground plane 27 is provided at a perimeter of the gatemon qubit. One challenge associated with the hybrid super-semi devices is identifying and reducing the sources of microwave loss. An extensive body of research has focused on characterizing and improving dielectric loss at surfaces and in bulk substrates for super-conducting qubits. Similar work in semiconductor quantum-dot qubits focuses on materials improvements to reduce charge noise. The fabrication of gatemon qubits containing super-semi JJs, similar to dot-resonator experiments, typically involves additional design and process steps to prepare and position the semiconducting element relative to the superconducting components. In particular, maintaining sufficient quality of the superconducting elements while maintaining voltage-tunability of the super-semi JJ involves removing excess lossy material in the case of gatemon devices based on 2D electron/hole gas (2DEG/2DHG). These complications can lengthen the iterative process between device fabrication and measurement and may also impede progress toward multi-qubit demonstrations.

SUMMARY

The quantum device includes 3D TSV gatemon (i.e. a transmon qubit variant that utilizes a voltage tunable super-conducting-semiconducting Josephson junction) qubits and coupled qubit systems. The gatemon qubit is formed across two wafers and has lower microwave loss, is fabricated more easily, and provides greater design flexibility than other super-semi qubit devices. Such a device can be made using flip-chip technology, in which the active components of both a probe wafer and sample wafer are placed facing each other with a small (or zero) separation between wafers. This increases the options for materials choices and signal routing while reducing fabrication demands. Through-Silicon Via (TSV) technology allows for an additional layer of connectivity and signal routing and has been recently integrated into active components used in superconducting control lines and readout, as well as qubits and is utilized in the quantum device in a multi-surface configuration. The invention also offers improved qubit coherence for very thick and lossy sample substrates. It is also compatible with a high coherence, magnetic field free, multi-qubit coupling architecture. The modular nature of the probe wafer makes it compatible as a tool for studying other systems, such as layered 2D materials in which processing of the sample wafer could be drastically simplified.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 3A:
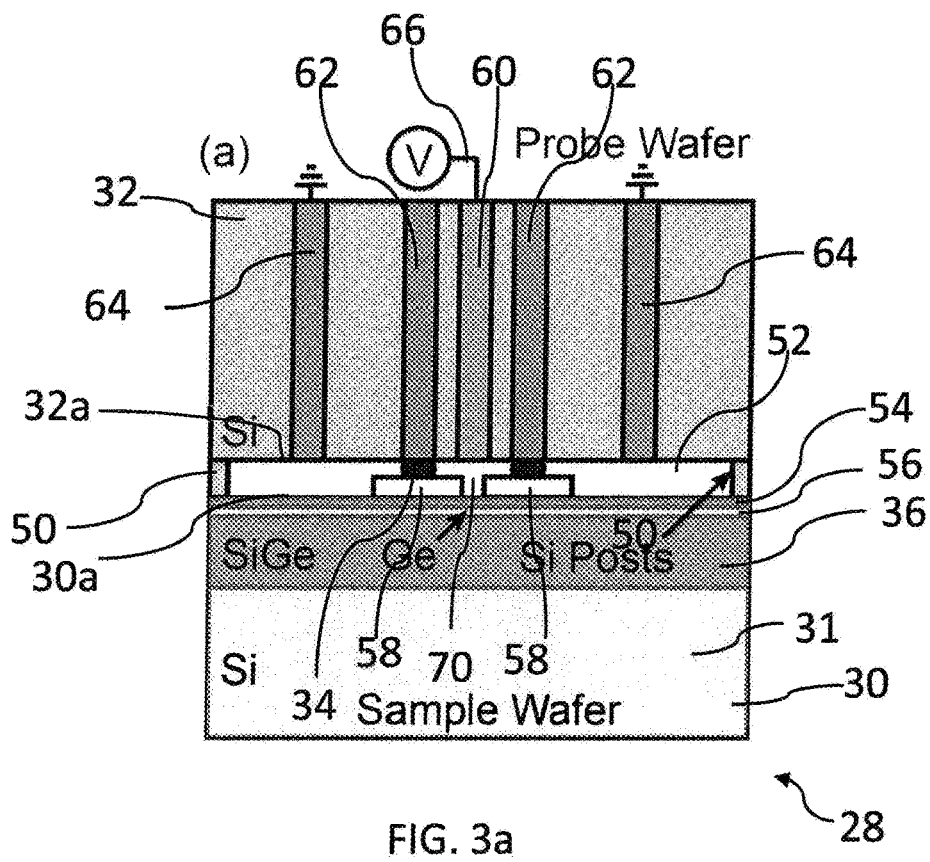
Figure 3B:
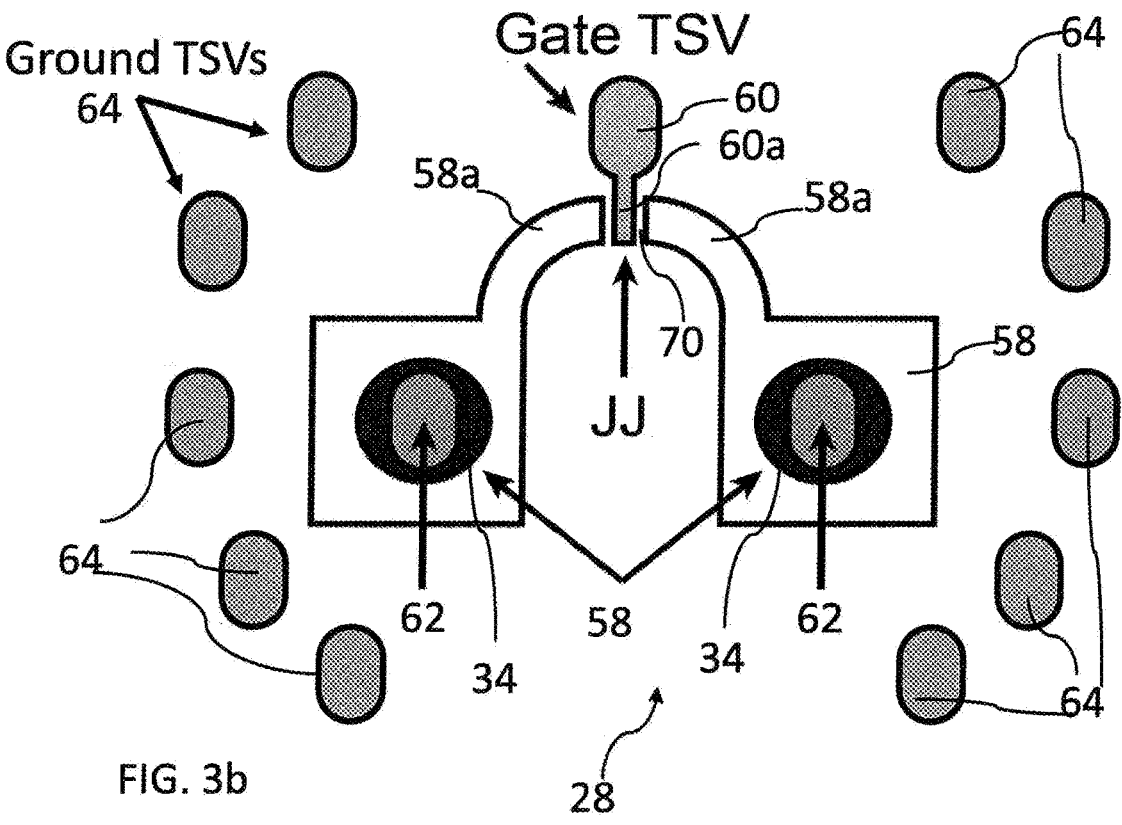

FIG. 3*a* illustrates a cross-sectional, profile view of a three-dimensional gatemon qubit device of the present invention;

FIG. 3*b* illustrates a top-down view of the metal portions of the three-dimensional gatemon qubit device illustrated in FIG. 3*a;*

Figure 1:
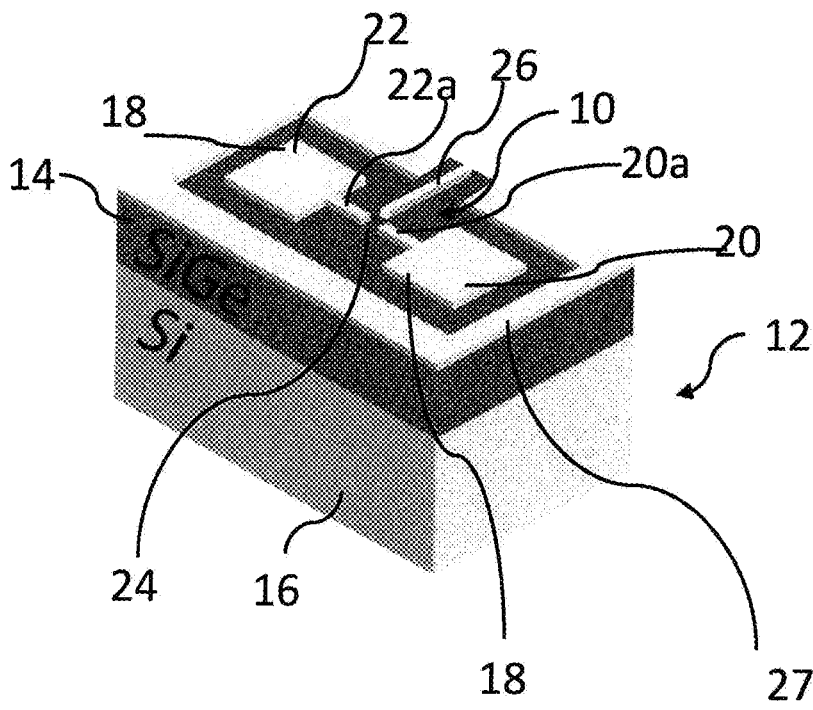
FIG. 1 illustrates a perspective view of a prior art planar gatemon device.
Figure 2:
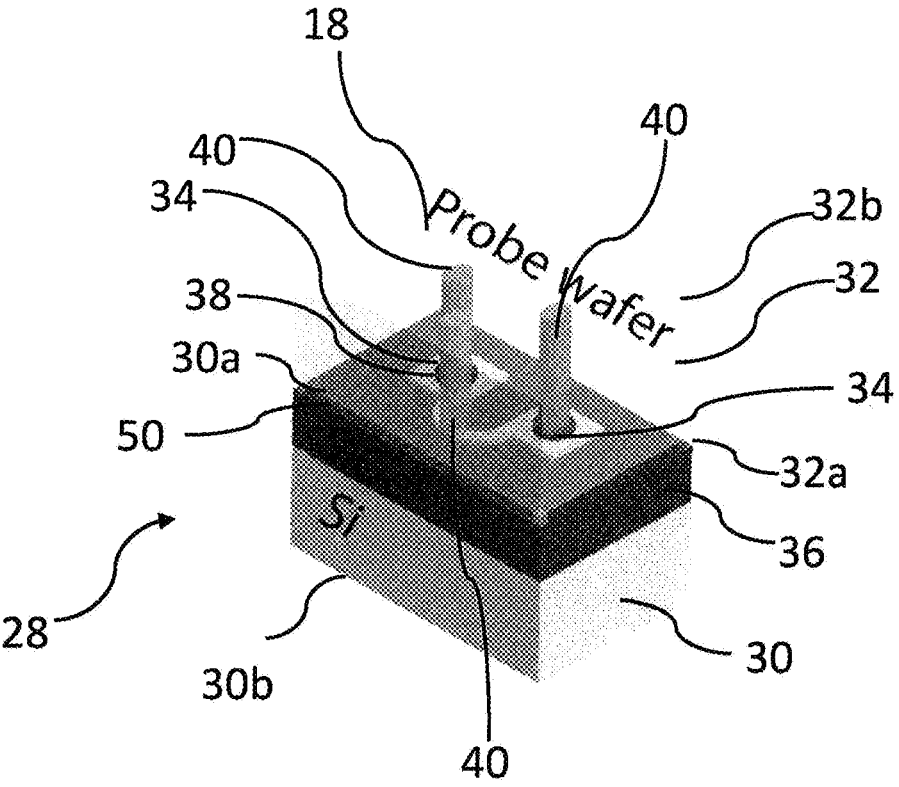
FIG. 2 illustrates a perspective view of the three-dimensional gatemon qubit device of the present invention with the ground TSVs removed in order to show additional features with greater clarity.
Figure 4:
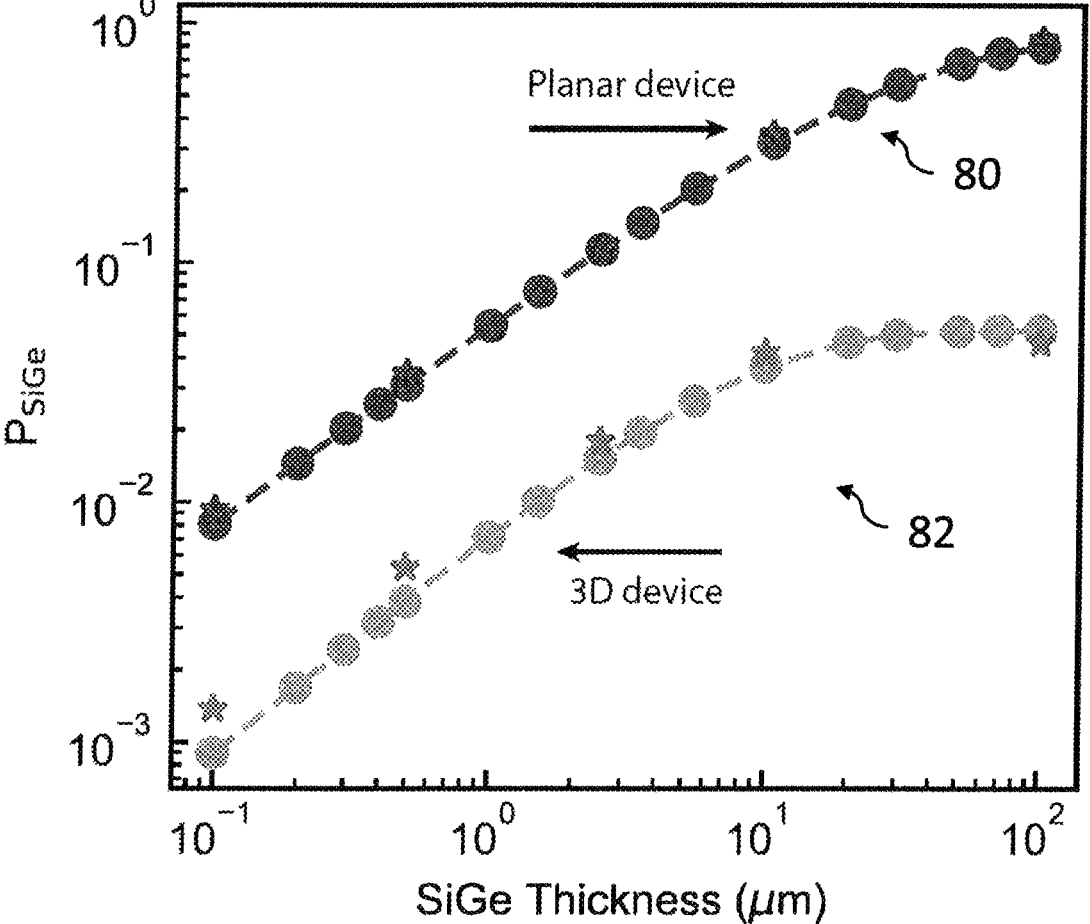
Figure 5:
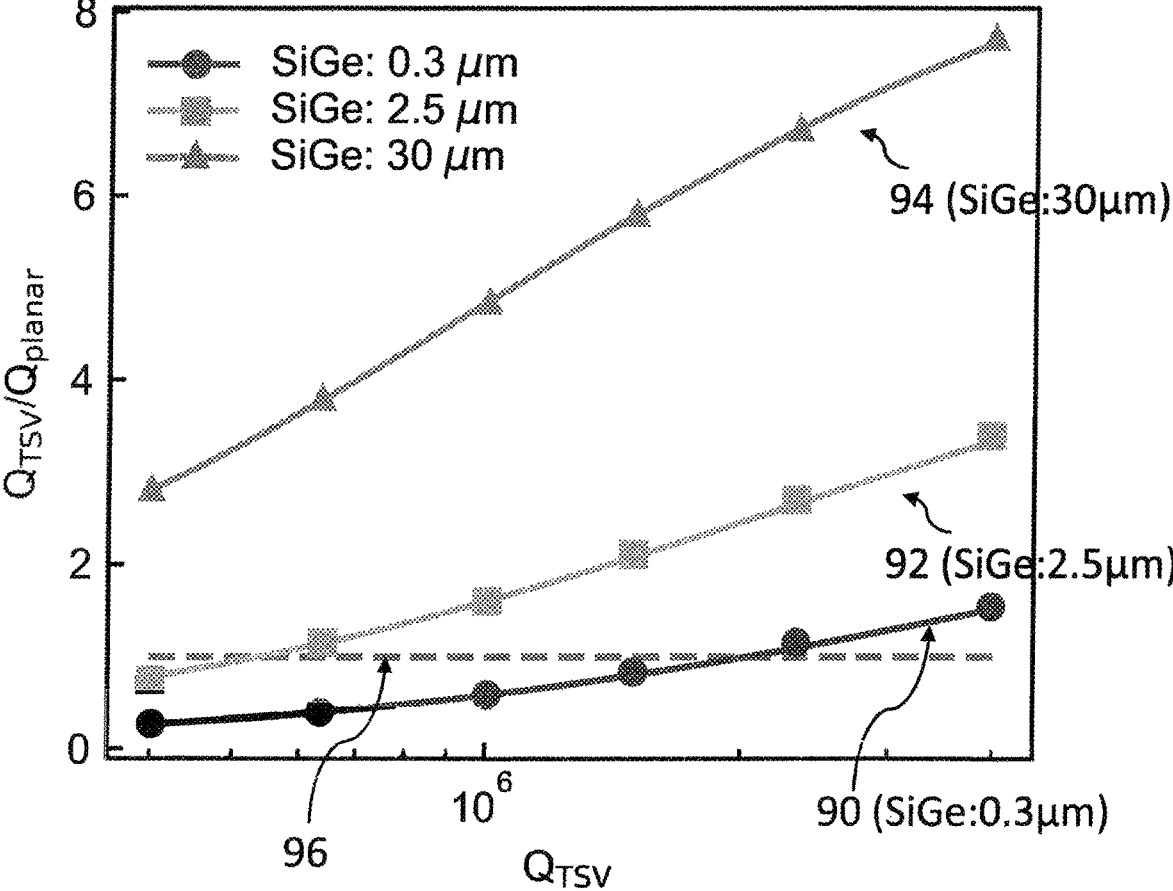
Figure 7:
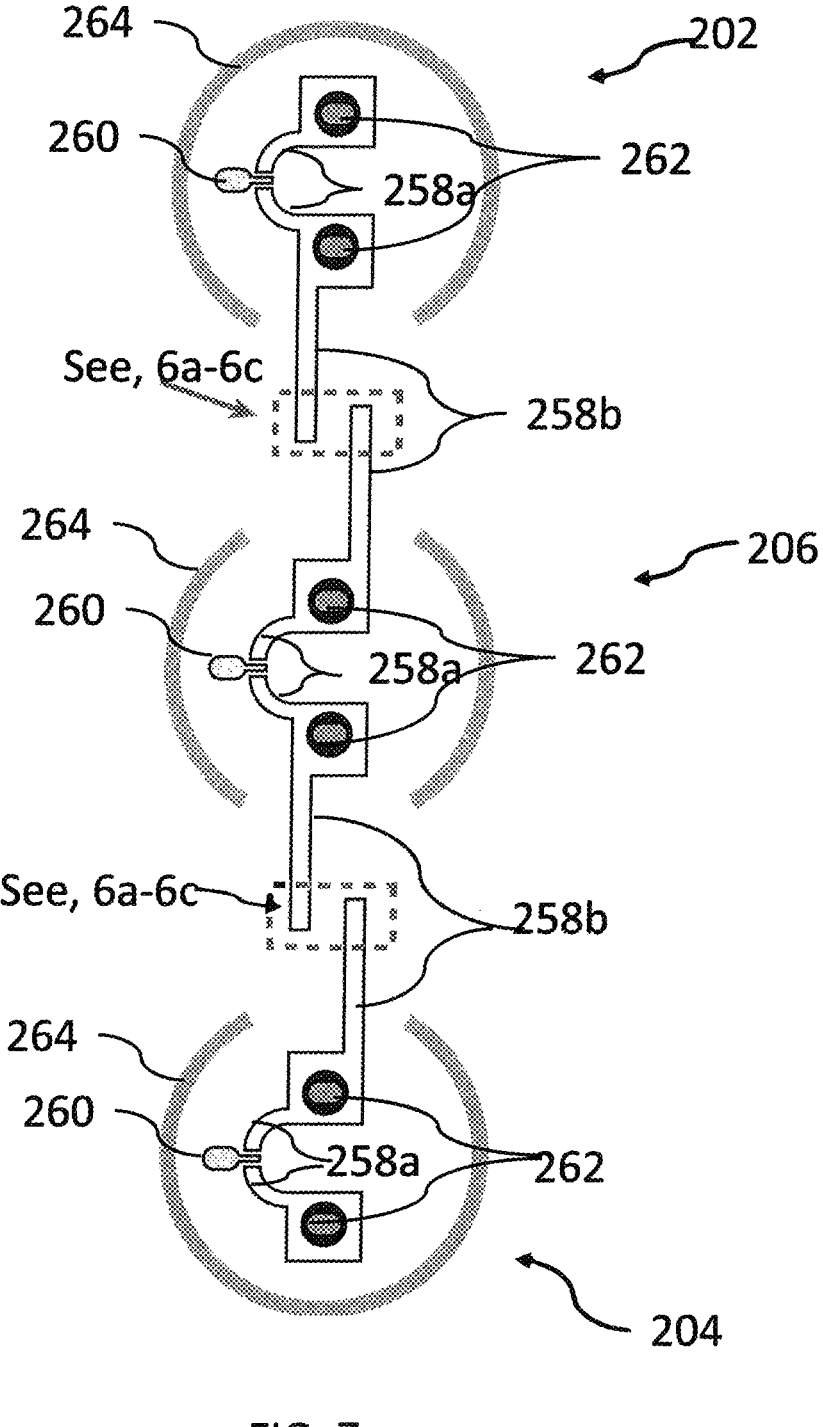
Figure 8A:
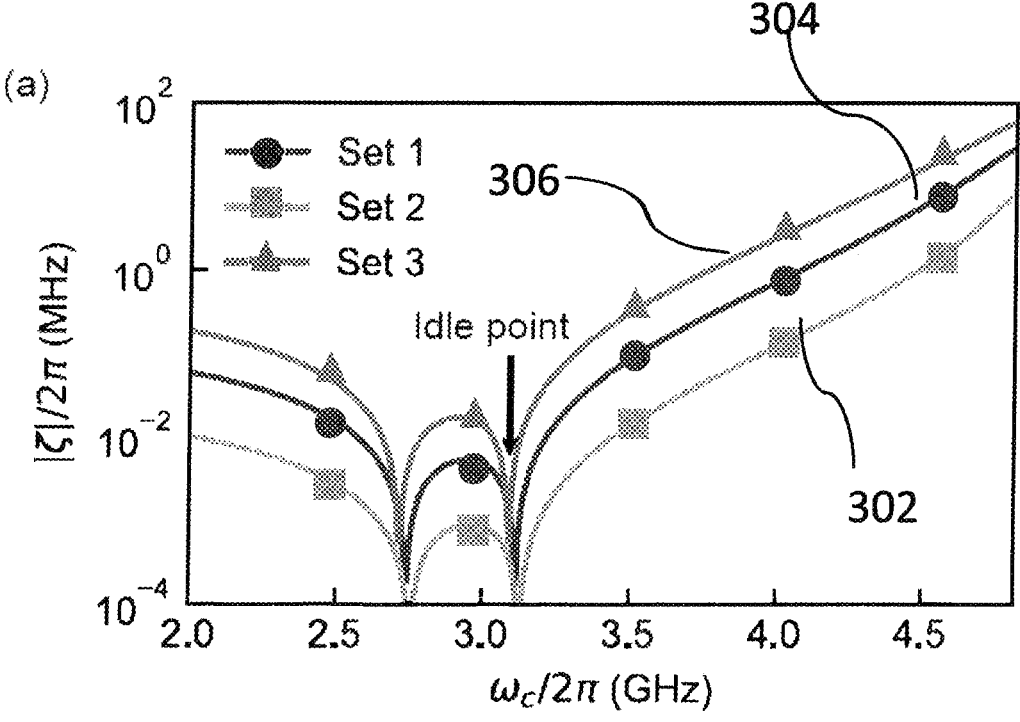
Figure 8B:
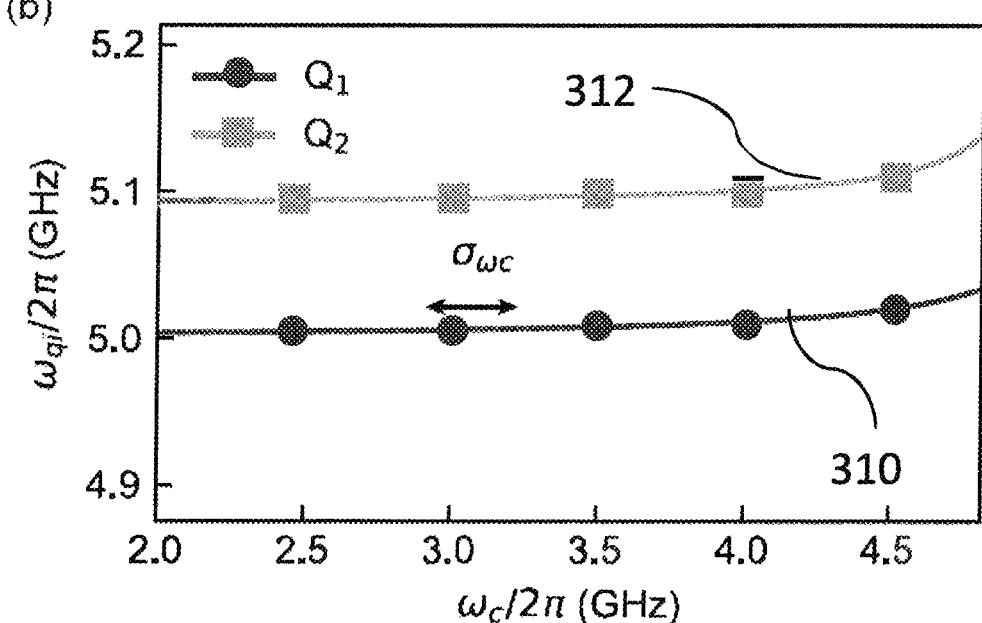
Figure 8C:
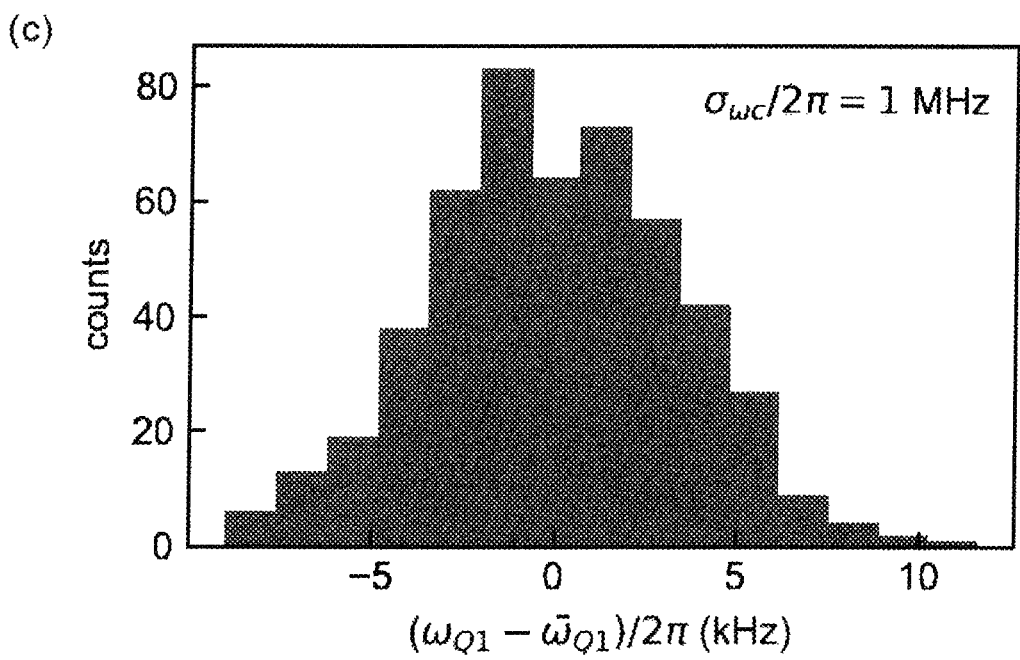
Figure 8D:
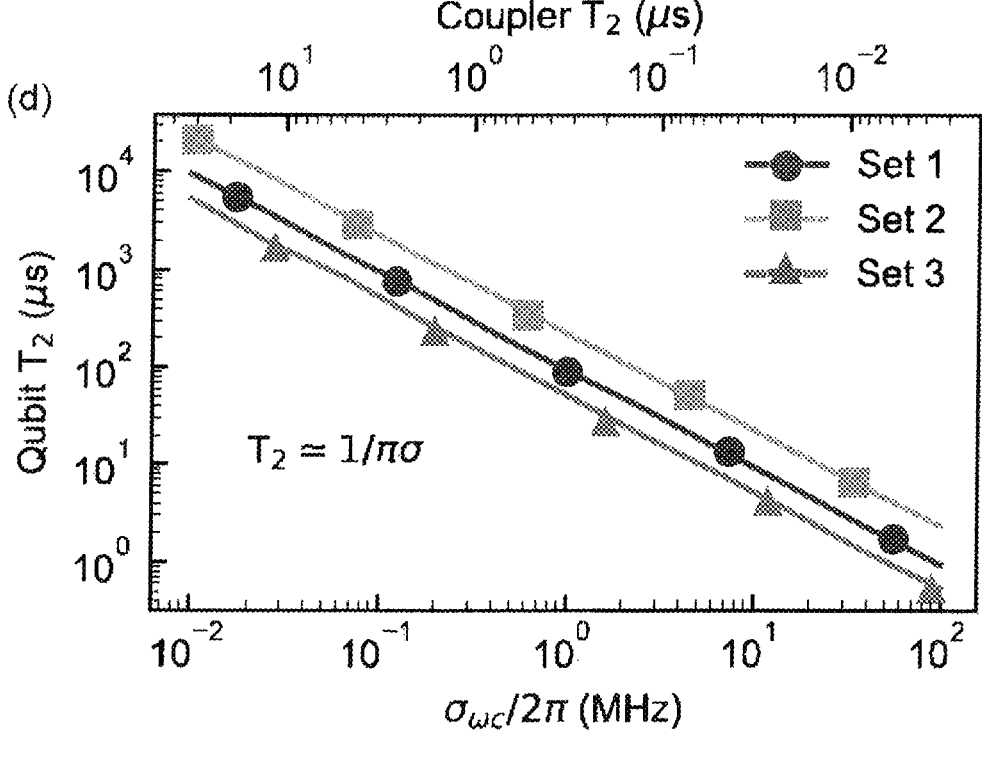

FIG. 4 provides a plot of the energy participation in the SiGe layer of the sample wafer of the planar gatemon qubit device of FIG. 1 as a function of SiGe layer thickness and also provides a plot of the energy participation in the SiGe layer of the sample wafer of the three-dimensional gatemon device of FIG. 2 as a function of SiGe layer thickness;

FIG. 5 is a plot of the ratio of the quality factors of the three-dimensional modular-based device and the planar gatemon devices ($Q_{TSV}$ to $Q_{planar}$) as a function of $Q_{TSV}$ for three semiconductor layer thicknesses;

FIG. 6 illustrates multi-qubit coupler systems using three-dimensional TSV qubits coupled to each other directly;

FIGS. 6a-6c illustrate different forms of coupling compatible with the coupled qubits of FIGS. 6 and 7;

FIG. 7 illustrates a multi-qubit coupler system using three-dimensional TSV qubits indirectly coupled to each other via a coupler qubit;

FIGS. 8a-8d illustrate simulation of the coupled qubits of FIG. 7;

FIG. 8a illustrates effective zz coupling strength between the simulated qubits 204 and 206 of FIG. 7 as a function of coupler frequency for three parameter sets;

FIG. 8b illustrates the qubit frequencies for the simulated qubits 204 and 206 of FIG. 7 vs. the coupler frequency;

FIG. 8c illustrates a histogram of the difference between the noise free and noisy qubit frequencies for simulated trials of qubits 204 and 206 of FIG. 7; and FIG. 8d illustrates conversion of the histogram of FIG. 8c to a coherence time $T_2$ for the qubits based on the strength of noise in the coupler system.

DETAILED DESCRIPTION OF PREFERRED EMBODIMENTS OF THE INVENTION

A quantum device including 3D TSV gatemon qubits, and/or qubit couplers (including directly coupled gatemon qubits and/or indirectly coupled qubits).of the present invention along with diagrams demonstrating the characteristics of these devices are illustrated in FIGS. 2-8. As will be discussed in further detail below, the gatemon qubits and qubit couplers include active components on two different wafers (i.e., a sample wafer and a probe wafer) in a flip-chip configuration.

As illustrated in FIG. 2, a gatemon qubit 28 incudes a sample wafer 30 and a probe wafer 32 positioned on top of the sample wafer portion 30. The wafers 30, 32 can be made of silicon, gallium arsenide, mercury cadmium telluride (HgCdTe), or any other suitable semiconductor. Connection between the wafers is provided via superconducting bump bonds 34. The sample wafer 30 provides a front surface 30a and a back surface 30b. An epitaxially grown SiGe heterostructure 36 and superconducting metal structures 38 are provided on the front surface 30a of the sample wafer 30. A Josephson junction is formed in the space between the superconducting metal structures 38. The probe wafer 32 is high quality, e.g., it has quality factor of 1,000,000 or more (e.g. up to 5,000,000) and includes a front surface 32a and a back surface 32b. The probe wafer 32 incorporates superconducting through-silicon vias (TSVs) 40, which have diameters of less than or equal to about 20 µm and at least some of the TSVs connect device components on the probe wafer's front and back surfaces 32a, 32b. The TSVs 40 can be formed from any superconductor, including elemental superconductors, such as aluminum, niobium, or tantalum, or mixtures, such as titanium nitride or niobium titanium nitride. The Josephson energy of the gatemon qubit is adjusted with the voltage set on a TSV 40 positioned proximate the Josephson junction. Separation/spacing between the probe and sample wafers 32, 30 is defined by etched silicon spacers 50 on the edges of the probe wafer 32. As illustrated in FIG. 3a, the spacers 50, define an air gap between the front surface 30a of the sample wafer 30 and the front surface 32a of the probe wafer 32. Although benefits of the invention may be achieved even when the spacing between the probe and sample wafers is larger, best results are achieved when the spacing is 1000 nm or less. The spacing provided between the probe and sample wafers is typically in the range of 500-1000 nm. As noted above, the wafers 30, 32 are connected via superconducting bump bonds 34. The majority of the qubit electric field energy is confined to the bulk of the (high-quality) probe wafer 32, and away from both the sample wafer 30 and the lossy metal-air interfaces.

FIG. 3a illustrates a cross-sectional view of the qubit device 28 and FIG. 3b illustrates an elevated view of the metal portions of the qubit device 28. The qubit device 28 generally includes the probe wafer 32 mounted on and bonded with the sample wafer 30 via superconducting bump bonds 34. The sample wafer 30 is provided by the epitaxially grown SiGe heterostructure 36 on the surface of a high-resistivity silicon substrate 31, the epitaxially grown Ge forming a quantum well 56, and the epitaxially grown aluminum capping layer 54. Although the heterostructure 36 of the sample wafer 30 has been described as SiGe, other proximitized 2D materials such as InGaAs may be used for the sample wafer. A single lithography step and aluminum etch is provided in connection with the aluminum capping layer 54 to simultaneously define the gatemon aluminum contact pads 58. The capping layer 54 provides a low-transparency connection between the SiGe layers and the Cooper pairs in the aluminum, which proximitizes the Ge quantum well 56 in the region under contact pads 58 at low temperatures. Each gatemon contact pad 58 includes an inwardly extending arm 58a (see, FIG. 3b). Although arms 58a are illustrated as arc-shaped, it is not necessary for the arms 58a to be shaped in this manner. A gap 70 is provided between the free ends of the inwardly extending arms 58a of the contact pads 58. The gap 70 is used to form the voltage-tunable Josephson junction.

The probe wafer 32 is formed from silicon. The probe wafer includes several TSVs, including a gate TSV 60, a pair of capacitor TSVs 62, and a plurality of optional grounding/shielding TSVs 64. Each TSV is provided by superconducting metal and extends from the front surface 32a to the back surface 32b of the probe wafer.

As illustrated in FIG. 3b, the gate TSV 60 includes an extension 60a. The gate TSV 60 runs through the probe wafer 32 and extension 60a of the gate TSV 60 is centered over the etched gap 70 in the aluminum. A control line 66 is provided in communication with the gate TSV 60 to provide an electrode that tunes the Josephson energy $E_j$ via the chemical potential of the quantum well 56. The control line 66 may also provide connection with the gate TSV of a nearby qubit. The combination of the non-linear Josephson inductance and the shunting TSV capacitors 62 form the electromagnetic mode of the qubit 28. By applying microwave pulses to the gate TSV 60, the state of the qubit 28 can be manipulated. The symmetry of the tuning gate electrode 60 between the capacitor pads 58 suppresses the tuning gate electrode's coupling to the (differential) qubit degree of freedom, thereby reducing or minimizing its contribution to qubit relaxation.

The capacitor TSVs 62 run through the probe wafer 32 to the superconducting bump bonds 34 and connect to the metal on the sample wafer 30 via the superconducting bump bonds, formed with indium, for example. The total capacitance of the qubit 28 comes from a combination of the on-chip contact pads 58 and the associated TSV capacitors 62.

Grounding/shield TSVs 64 of the probe wafer 32 are positioned outside the qubit and provide shielding of the qubit 28 to prevent spurious electromagnetic coupling with nearby qubits and control lines. As illustrated in FIGS. 3$a$ and 3$b$, the grounding/shielding TSVs 64 are spaced from the capacitor TSVs 62 and extend from the front surface 32$a$ of the probe wafer 32 to the back surface 32$a$ of the probe wafer 32. The ground TSVs 64 are arranged in two arcs which together form a generally ring-shaped wall encompassing the capacitor and gate TSVs of the qubit 28.

Dielectric loss can play a dominant role in limiting the quality factors and lifetimes of superconducting resonators and qubits. The excited-state lifetime, $T_1$, of a transmon qubit with frequency $\omega$ can be approximated as:

$$\frac{1}{T_1} = \frac{\omega}{Q} = \omega \sum_i \frac{P_i}{Q_i} + \Gamma_0,$$

where the decay rate has been broken into a sum of terms associated with dielectric losses in different materials and interfaces (each with a fractional participation of $P_i$ and quality factor $Q_i$) and a term $\Gamma_o$ which captures the decay rate due to all other mechanisms (such as quasiparticle tunneling across the JJ and damping due to coupling to the measurement circuitry). Each $P_i$ can be calculated via finite-element simulation, by defining voltages on the qubit electrodes (i.e. the gate and capacitor TSVs), solving for the DC electric field across the device, and integrating the field in each of different dielectric volumes, $$P_i = \int_{V_i} \varepsilon_i |E_i|^2 / U_{tot}$$

where $\varepsilon_i$ is the dielectric constant of a region and $U_{tot}$ is the total energy stored in the system.

FIG. 4 provides a comparison of two plots based upon simulations of the planar gatemon device 10 and the three-dimensional (3D) TSV gatemon device 28 using an electrostatic solver. We simulate the electric field distribution over four volumes: the two Si substrates, the SiGe epitaxial layers, a 5 nm thick oxide layer on top of the qubit and ground plane, and the vacuum between the two wafers (here assumed to be separated by 1 µm). To verify the DC electric field accurately captures the field participation of the planar and 3D geometries, we add a lumped element inductor between the qubit capacitors, find the eigenmodes of the system, and calculate $P_{SiGe}$ near the qubit frequency of 4-5 GHz. The data from the eigenmode solver is represented by the star icons in FIG. 4. It is observed that the DC field solutions provided by the electrostatic solver are in good agreement with the data from the eigenmode solver, indicating that for these qubit geometries, using the simpler electrostatic solver is sufficient to accurately model the field participation.

Plot 80 is a plot of the energy participation in the SiGe layer of the sample wafer as a function of SiGe layer thickness for a planar device such as the device 10 illustrated in FIG. 1. The planar gatemon capacitor pads 20, 22 are 300 µm square with 50 µm spacing between the pads 20, 22 and ground plane 27. The multilayer epitaxial quantum well heterostructure is approximated as a uniform block of $Si_{0.8}Ge_{0.2}$ with a dielectric constant of $\varepsilon_y$=12.6 and the $P_{SiGe}$ is calculated as a function of the SiGe layer thickness. Plot 82 is a plot of the energy participation in the SiGe layer of the sample wafer as a function of SiGe layer thickness for the 3D TSV voltage tunable qubit of the present invention such as the device 28 illustrated in FIGS. 2-3.

For each plot 80, 82 as the thickness of the SiGe layer grows the energy participation in the SiGe layer increases. Comparing plots 80, 82 however it is observed that for SiGe layers<10 µm, $P_{SiGe}$ is an order of magnitude smaller for the 3D TSV-based devices compared to the planar gatemons. In addition for the 3D TSV-based device, for the SiGe thicknesses above 10 µm, $P_{SiGe}$ saturates at around $P_{SiGe}$~5%.

A reduction in the $P_{SiGe}$ is particularly advantageous when the SiGe loss tangent in the epitaxial layer (tan $\delta_{SiGe}$) is large compared to that of bulk Si. The loss in bulk SiGe is believed to arise from threading dislocations originating at the interface between the silicon layer and the epitaxial heterostructure grown on the surface; however, its exact origin is a matter of ongoing study. A dimensionless quality factor Q is defined as the ratio of energy stored divided by energy lost per cycle of a resonant circuit or qubit.

In FIG. 5, we compare the quality factors of the planar and 3D TSV devices using the calculated participation factor and recently reported value of tan $\delta_{SiGe}$=1.6×10$^{-5}$, as reported at Appl. Phys. Lett. 118, 124001 (2021). FIG. 5 provides a plot of the ratio of the quality factors, of the 3D TSV-based device and the planar gatemon devices ($Q_{TSV}$ to $Q_{planar}$) as a function of $Q_{TSV}$ Three plots 90, 92, 94 are illustrated in FIG. 5. Plot 90 relates to planar qubit and 3D TSV qubit devices having SiGe layer thickness of 0.3 µm; plot 92 relates to a planar qubit and 3D TSV qubit devices having SiGe layer thickness of 2.5 µm; and plot 94 relates to planar qubit and 3D TSV qubit devices having SiGe layer thickness of 30 µm. The plots demonstrate that for thick SiGe layers, the 3D design yields significant improvement at the currently achievable $Q_{TSV}$. The absolute magnitudes of the quality factors depend on the value of $Q_{TSV}$ (bottom axis). For instance, the cross over values for SiGe layers with thicknesses of 0.3 µm, 2.5 µm, and 30 µm are about 2,000,000, about 550,000, and even lower respectively. The most significant improvement occurs in plot 94 indicating that when comparing quality factors of the planar and 3D TSV devices, the greatest improvement is realized for thick SiGe layers. The dashed line 96 indicates the break-even point, i.e., where the quality factor of the 3D TSV based device and the quality factor of the planar device are the same. Above the breakeven point, the device performance of the 3D TSV qubit is enhanced over the traditional planar designs. As illustrated, this improvement in device performance is achieved for all values of $Q_{TSV}$>550,000 and for SiGe layer thicknesses greater than 2.5 µm; i.e., the improved device performance offers lower losses for the 3D TSV qubit relative to the planar super-semi qubit 10 illustrated in FIG. 1.

An additional benefit of the 3D TSV device is a substantial reduction of the planar footprint of the qubit, since the majority of the qubit shunt capacitance, $C_{sh}$, is associated with the vertically oriented TSVs contained in the probe wafer 32. The qubit shunt capacitance is the total capacitance across the two sides of the Josephson Junction, coming both from the capacitance between the two capacitor TSVs 62 to each other and to the ground TSVs 64. Increasing this capacitance reduces the qubits sensitivity to charge noise and having a large value of $C_{sh}$ is a key part of the device performance. Typically, the capacitance value is related to the physical size of the superconducting metal on each side of the Josephson junction, which has previously primarily been constructed with flat (2D) capacitors. By moving to a 3D design, the 2D footprint can be small and the capacitor can then be made large in the vertical dimension which had previously been unutilized. In the device design presented here, the footprint of the gatemon 28 is reduced by over an order of magnitude, from 0.18 mm² to 0.014 mm², while maintaining a high quality factor (Q). In addition, the vertically oriented capacitor in the probe wafer can be much more effectively shielded electrostatically (using TSV-based via wall structures) than a planar design, allowing adjacent qubits to be placed in closer proximity without increasing parasitic couplings.

Fabrication demands of the 3D TSV design of the present invention are reduced relative to a planar super-semi qubit illustrated in FIG. 1. For example, in a traditional planar gatemon device, several steps are needed in order to define and etch the regions of aluminum on the SiGe sample wafer. Once that process is completed, the excess SiGe needs to be removed away from the Josephson junction which adds an additional photolithography and etch step. Once these are completed, additional dielectric and gate electrodes need to be added to the SiGe wafer. By utilizing a probe wafer, the only step needed for fabrication on the sample wafer is an etch of the aluminum capping layer to simultaneously define the pads and gap (58, 58a and 70 in FIG. 3) on the sample wafer 30. This drastically reduces the number of fabrication steps saving weeks of time per fabrication iteration. In addition, the simplified fabrication results in less processing of the sample wafer 30 containing the semiconductor heterostructure. By reducing processing of the sample wafer the risk of introducing impurities is reduced and the risk of damaging the wafer during the processing steps is reduced.

The 3D TSV design of the present invention offers greater design flexibility, more options for material selection, and greater flexibility for signal routing. In traditional planar super-semi qubit designs as shown in FIG. 1, the fabrication processes, including etch chemistries and materials compatibility, must be developed with an iterative trial and error process, for example, the use of GaAs instead of SiGe as a sample wafer might require processing with a chlorine etch rather than a fluorine etch, thus drastically slowing progress in studying super-semi devices in new materials systems. With the probe wafer design, the processing of the probe wafer only needs to be determined once and is independent of the material type on the sample wafer. In terms of signal routing, by having a probe wafer with TSV components, signals can be transmitted on surfaces 32a, 32b, and 30a (see FIG. 2 or 3a) as opposed to just one surface in the prior planar gatemon designs.

FIG. 6 illustrates a voltage-controlled tunable coupler 100 implemented using the 3D TSV qubit 28 of the present invention. The coupler 100 includes a first 3D TSV qubit 102 and a second 3D TSV qubit 104 directly coupled to the first 3D TSV qubit 102. The 3D TSV qubits 102, 104 are formed using a sample wafer and a probe wafer as described above in connection with the 3D TSV qubit 28. More specifically, a sample wafer provides aluminum contact pads 158 for the first and second qubits and a probe wafer provides gate, capacitor and grounding TSVs 60, 62, 64 for the first and second qubits 102, 104. Although illustrated in FIG. 6 as a continuous arc for simplicity, it is to be understood that the ground TSVs. 64 of FIG. 6 are provided by a plurality of ground TSV arranged to form a nearly complete ring around each qubit 102, 104. Similar to the contact pads 58 described above in connection with FIG. 3b, each contact pad 158 includes an inwardly extending arm 158a having a free end. As illustrated in FIG. 6, each qubit 102, 104 further includes a coupling extension 158b for coupling qubit 102 to qubit 104. Formation of coupling extensions 158b is provided by the single lithography step and aluminum etch on the sample wafer which define the gatemon aluminum contact pads 158. Coupling extension 158b of qubit 102 is positioned proximate coupling extension 158b of qubit 104.

As illustrated in FIGS. 6a-6c, a variety of coupling types may be used to couple extension 158b of qubit 102 with extension 158b of qubit 104. FIG. 6a, illustrates fixed capacitive coupling between extensions 158b. FIG. 6b illustrates tunable inductive coupling between extensions 158b. The tunable inductive coupling illustrated in FIG. 6b includes a tunable Josephson junction 160b between free ends of the extensions 158b. The inductive coupling is tuned in the same fashion as the gate TSV 60 on each of the qubits 102 and 104. FIG. 6c illustrates tunable inductive coupling with compensating inductance between extensions 158b. The coupling illustrated in FIG. 6e includes a gate TSV 160c along with a small wire inductor 162c between free ends of the extensions 158b. The inductive coupling is tuned by the voltage on the gate TSV 160c and the inductance 162c compensates for stray capacitive coupling, giving rise to a true off point in the coupling where the coupling between qubits 102 and 104 is zero.

FIG. 7 illustrates a coupler system 200 implemented using 3D TSV qubits of the present invention. The voltage tunable coupler system 200 includes a first 3D TSV qubit 202 and a second 3D TSV qubit 204 coupled to the first 3D TSV qubit 202 via indirect coupling. The indirect coupling between the first and second 3D TSVs qubits 202, 204 is provided via a third/coupler TSV qubit 206. The 3D TSV qubits 202, 204, 206 are formed using a sample wafer and a probe wafer as described above in connection with the 3D TSV qubit 28. More specifically, a sample wafer provides aluminum contact pads 258 for the first, second, and third qubits 202, 204, 206 and a probe wafer provides gate, capacitor and grounding TSVs 260, 262, 264 for the first, second and third qubits 202, 204, 206. Although illustrated in FIG. 7 as continuous arcs for simplicity, it is to be understood that the ground TSVs. 264 of FIG. 7 are provided by a plurality of ground TSVs arranged to form a nearly complete ring around each qubit 202, 204 and arranged to form two arcs around qubit 206. The grounding TSVs 264 reduce parasitic capacitance between the qubits and non-nearest neighbor qubits (i.e., those qubits not intentionally coupled with each other via coupling extensions). This is valuable for large arrays of qubits where each qubit should only be coupled to its nearest neighbors (i.e. qubits to which it is intentionally coupled via the coupling methods illustrated in FIGS. 6a-6c, for example), and have no coupling to qubits further away in the array (i.e., the non-nearest neighbors). Similar to the contact pads 58 described above in connection with FIG. 3b, each contact pad 258 includes an inwardly extending arm 258a having a free end. As illustrated in FIG. 7, each qubit 202, 204, 206 includes a coupling extension 258b for coupling with a neighboring qubit. It is noted that coupler qubit 206 includes two coupling extensions 258b to provide coupling with nearest neighbor qubit 202 and with nearest neighbor qubit 204. Formation of coupling extensions 258b is provided by the single lithography step and aluminum etch on the sample wafer which define the gatemon aluminum contact pads 258. Although fixed capacitive coupling is illustrated in FIG. 7, any of the coupling types illustrated in FIG. 6a-6c may be used with coupling extensions 258b.

The multi-qubit system of FIG. 7 can be described by the following Hamiltonian:

$$H = \sum_{i=1,2,o} \left( \omega_i a_i^\dagger a_i - \frac{\alpha_i}{2} a_i^\dagger a_i^\dagger a_i a_i \right) + \sum_{i-j} g_{i,j} \left( a_i^\dagger a_j + a_i a_j^\dagger \right)$$

Where $\omega_i$ and $\alpha_i$ are the qubit/coupler frequencies and anharmonicities respectively, $g_{i,j}$ are the coupling strength between the qubits 202, 204 and coupler 206, and a (at) are the creation (annihilation) operators for each qubit 202, 204 and coupler qubit 206.

The voltage tunable coupler system 200 of FIG. 7 can be used with most types of coupling schemes. The coupler system 200 includes two 3D TSV differential transmon qubits 202, 204 coupled via a 3D TSV tunable coupler qubit 206 having a frequency lower than the frequencies of the two qubits 202, 204. The qubit-qubit interaction is of the form zz with an interaction strength $\zeta = \omega_{11} - \omega_{10} - \omega_{01} - \omega_{00}$, where $\omega_{ij}$ are the excitation frequencies of each qubit 202, 204 in the coupler system 200. The Hamiltonian above is numerically diagonalized to find the qubit 202, 204 and coupler 206 frequencies as well as the magnitude of $\zeta$. In this layout, the coupler 206 is assumed to remain in its ground state.

A short voltage pulse on the gate TSV 260 of the coupler 206 adjusts the tunable-coupler frequency $\omega_c$ and changes the magnitude of $\zeta$ to perform a controlled-Z gate between the two qubits 202, 204. As the coupler 206 frequency is adjusted by the change in junction transparency, a local effect on the scale of the junction dimensions, cross-talk from adjacent coupler pulses is expected to be substantially reduced compared to flux-based control schemes which have cross-talk typically on the order of about 10%.

Tunable coupling between qubits as illustrated in FIG. 7 has the potential for higher on/off ratios of interaction between qubits compared to systems based on the fixed two-qubit coupling illustrated in FIG. 6 and prior art microwave-drive-activated gates. Tunable coupling between superconducting qubits of prior art systems is typically achieved by modulating the magnetic flux bias applied to a nonlinear coupler circuit (such as a SQUID), thereby changing the effective mutual inductance between qubits. To reduce the resulting additional susceptibility to flux noise via the coupler circuits, the qubits are typically designed so that a relatively large difference in coupler flux bias separates the qubits' on and off states. However, as the circuit size and the number of qubits and couplers increases, it becomes increasingly challenging to independently control these large flux bias signals, due to the nonlinearity and nonlocality of Meissner screening of these signals by surrounding superconducting circuit elements.

These difficulties could in principle be avoided by using voltage-sensitive coupler circuits, since electrostatic shielding for reduction of parasitic is much better controlled and scalable. In fact, proposals for electrostatically tunable couplers date back to the early days of Cooper-pair box qubits. However, these kinds of circuits tend to be impractical experimentally due to nonstationary, low-frequency electric noise in the form of slowly drifting offset charges and quasi-particle tunneling events. The 3D) TSV gatemon qubits of the present invention present a new opportunity to revisit these schemes, since their voltage tunability is of an entirely different, semiconducting character, and could be dominated by less severe noise processes. The TSV-based 3D design presented here gives a natural platform for realizing such schemes.

FIGS. 8a-8d illustrate simulation of the qubits 202, 204 coupled via a tunable coupler 206.

FIG. 8a illustrates effective zz coupling strength, $\zeta$, between the qubits 202, 204 as a function of coupler frequency $\omega_c$ for three parameter sets. Parameter set 1 provides that $g_{1c} = g_{2c} = 110$ MHz, $g_{12} = -6$ MHz; parameter set 2 provides that $g_{1c} = g_{2c} = 70$ MHz, $g_{12} = -2.5$ MHz; and parameter set 3 provides that $g_{1c} = g_{2c} = 150$ MHz, $g_{12} = -11$ MHz In all cases $\alpha_{1,2,c} = -260$ MHz. These parameters are chosen such that the coupler 206 idle frequency is similar for the three parameter sets. As demonstrated by the calculation of $P_i$, coupler strength is impacted by the size and proximity of the coupling extensions forming the Josephson junction and the qubit frequencies. Plot 302 represents qubits 202, 204 wherein the size of overlap between the coupler extensions 258b is two-thirds that of the overlap size in plot 304; and plot 306 represents qubits 202, 204 wherein the size of overlap between the coupler extensions 258b is four-thirds (larger) than that of the overlap size in plot 304. When $\zeta = 0$, the two qubits 202, 204 are decoupled and when $\zeta \neq 0$, the qubits 202, 204 are coupled at a rate of $|\zeta|/2\pi$ in Megahertz. FIG. 8a demonstrates how the coupling strength can be tuned from a non-zero to zero by adjusting the frequency of the coupler, $\omega_c$, (using gate TSV 260 of coupler/qubit 206 in FIG. 7). For the parameter sets show in FIG. 8a, zero-coupling occurs at two points, we chose one of these points (3.2 GHz) as the idle point. One potential area of concern of this coupling scheme is the deleterious effects of gate noise, which changes coupler frequency dc and can shift the qubit frequencies $\omega_{qi}$ causing a reduction in their coherence times $T_2$ similar to what has been noted in flux-based tunable coupling schemes. To investigate the potential impact of this noise on qubit coherence, we look at the dressed qubit frequencies.

FIG. 8b illustrates the qubit frequencies $\omega_{qi}$ for the two qubits 202, 204 vs. the frequency of the coupler 206, $\omega_c$. Specifically, plot 310 relates to qubit 202 and plot 312 relates to qubit 204. Notably, the curves 310, 312 are relatively flat in the middle and left side of the plot indicating that if there is noise on gate 260 of coupler 206, with strength $\sigma_{\omega_c}$, the noise will minimally change the qubit frequencies and therefore will not drastically impact the performance of the qubits 202, 204. However, the finite derivative of $d\omega_q/d\omega_c$ implies that changes to the coupler frequency, $\sigma_{\omega c}$, though charge noise or gate voltage fluctuations moves the qubit frequencies, the effect of which needs to be understood.

To check the effect of the noise described in connection with FIG. 8b, we simulate trials with different values of the noise $\sigma_{\omega c}$, and we see how much that moves the qubit frequency. FIG. 8c provides a histogram of the difference between the noise free and noisy qubit frequencies for a thousand different values of $\varepsilon$ for a $\sigma_{\omega c} = 1$ MHz. The noise is normal or "Gaussian" as illustrated by the bell-shaped curve in FIG. 8c and the width of the curve in frequency units is approximately 10 kHz. From this width, we can extract the corresponding value of a coherence time $T_2$ of the qubits based on the strength of the noise in the coupler, as illustrated in FIG. 8d.

FIG. 8d represents a plot of the width and corresponding $T_2$ for different levels of noise on gate 260 of coupler 206. This lets us know how the qubits 202 and 204 will perform. We plot this for the same sets of coupling used in FIG. 8a. As evidenced by the offset of the lines plotted in FIG. 8d, for stronger couplings, the noise makes a more significant contribution As mentioned above, however, for modest values of $\sigma_{\omega_c}$, the minimum coherence time $T_2$ for the 3D TSV qubit of FIG. 7 is already beyond state of the art (approximately 200-500 μs) in existing devices; i.e., if the noise is less than approximately 0.3 MHz, than the 3D TSV devices will not be limited by this noise.

A hybrid system may be provided where the coupler is fabricated from a 3D voltage tunable gatemon and the qubits are planar transmons with Al/AlO$_{x,x}$ JJs. In this hybrid system, we can quantify the impact of gate voltage coupler noise on qubit coherence by observing the dressed qubit frequencies as a function of the strength of gate noise. For each of the parameter sets described in connection with FIG. 8$a$, $\omega_c$ is set such that $\zeta$=0, with an additional offset from the idle point, $\varepsilon$. $\varepsilon$ is chosen from a zero-mean Gaussian distribution of coupler frequencies with a width of $\sigma_{\omega_d}$. We solve the Hamiltonian above for one thousand different values of $\varepsilon$ for a fixed value of $\sigma_{\omega_c}$ (FIG. 8$c$) to obtain the variation in dressed qubit frequencies. As the magnitude of gate voltage noise is not something that is known a priori, we repeat this process for different doc (FIG. 8$d$). For gatemon coupler coherence less than 1 μs, corresponding to $\sigma_{\omega_c}$≈0.3 MHz, the coherence limit via this dephasing mechanism for the qubits is still above 100 μs. This is encouraging, as coherence times much greater than 1 μs have already been demonstrated in gatemon devices, indicating that this scheme is compatible with existing devices. As the strength of coupling between the qubits and resonators increases, the qubit $T_2$ decreases, which implies that a balance should be made between strong coupling for fast two-qubit gates, but not so strong as to significantly impact the qubit coherence times.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A quantum device comprising:
at least one gatemon qubit, the gatemon qubit including,
   a sample wafer including a first superconducting pad having a first arm and second superconducting contact pad having a second arm, and a gap between the first and second arms forming a Josephson junction;
   a first superconducting bump bonded to the first contact pad and a second superconducting bump bonded to the second contact pad; a probe wafer supported above the surface of the sample wafer;
   a gate superconducting through-silicon via (TSV), extending through the probe wafer to the Josephson junction, to tune a Josephson energy of the Josephson junction; and
   a first capacitor superconducting TSV, extending through the probe wafer and bonded to the first superconducting bump and a second capacitor superconducting TSV, extending through the probe wafer and bonded to the second superconducting bump forming a shunting capacitance across the Josephson junction.

2. The quantum device of claim 1, wherein a first gatemon qubit further includes a coupling extension extending from said first superconducting contact pad; a second gatemon qubit further includes a coupling extension extending from said first superconducting contact pad; and the first gatemon qubit is coupled to the second gatemon qubit via the coupling extensions.

3. The quantum device of claim 2, wherein the coupling extensions of the first and second gatemon qubit provide inductive coupling.

4. The quantum device of claim 3, wherein the coupling extensions of the first and second gatemon qubit further include compensation inductance.

5. The quantum device of claim 2, wherein the coupling extensions of the first and second gatemon qubit provide capacitive coupling.

6. The quantum device of claim 2, further including a plurality of ground superconducting TSVs, extending through the probe wafer and spaced from the first and second capacitor TSVs, of the first gatemon qubit and a plurality of ground superconducting TSVs, extending through the probe wafer and spaced from the first and second capacitor TSVs, of the second gatemon qubit to shield the Josephson junctions from parasitic capacitance.

7. The quantum device of claim 6, wherein the ground TSVs partially encircle the capacitor and gate TSVs of the first and second gatemon qubits.

8. The quantum device of claim 1, wherein the at least one gatemon qubit further includes:
   a plurality of ground superconducting TSVs, extending through the probe wafer and spaced from the first and second capacitor TSVs, to shield the Josephson junction from parasitic capacitance.

9. The quantum device of claim 8, wherein said ground TSVs partially encircle the capacitor and gate TSVs.

10. The quantum device of claim 1, wherein a first gatemon qubit further includes a coupling extension extending from said first superconducting contact pad; a second gatemon qubit further includes a coupling extension extending from said first superconducting contact pad; a third gatemon qubit further includes a first coupling extension extending from said first superconducting contact pad and a second coupling extension extending from said second superconducting contact pad; and wherein the first and second gatemon qubits are coupled via the third gatemon qubit via the coupling extensions.

11. The quantum device of claim 10, further comprising a plurality of ground superconducting TSVs extending through the probe wafer and shielding the Josephson junctions of the gatemon qubits.

12. The quantum device of claim 10, wherein a coupling strength between the first and second gatemon qubits is changed when a voltage pulse is applied to the gate superconducting TSV of the third gatemon qubit.

13. The quantum device of claim 1, wherein the probe wafer has a quality factor of at least 550,000.

14. The quantum device of claim 1, wherein the at least one gatemon qubit, further includes:
   a coupling extension extending from said first superconducting contact pad.

15. The quantum device of claim 1, wherein at least one gatemon qubit further includes a first coupling extension extending from said first superconducting contact pad and a second coupling extension extending from said second superconducting contact pad; and wherein the at least one gatemon qubit is coupled to a first planar qubit via the first coupling extension and a second planar qubit via the second coupling extension.

* * * * *